US010127305B2

(12) United States Patent
Burstein et al.

(10) Patent No.: US 10,127,305 B2
(45) Date of Patent: Nov. 13, 2018

(54) PRESENTING A USER PROFILE

(71) Applicant: Microsoft Technology Licensing, LLC, Redmond, WA (US)

(72) Inventors: Elizabeth Ethel Burstein, San Francisco, CA (US); Christian Posse, Forster City, CA (US); Abhishek Gupta, San Francisco, CA (US); Anmol Bhasin, Los Altos, CA (US); Dmytro Andriyovich Ivchenko, Mountain View, CA (US); Parker R. Barrile, San Carlos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/401,554

(22) Filed: Jan. 9, 2017

(65) Prior Publication Data

US 2017/0178079 A1    Jun. 22, 2017

Related U.S. Application Data

(63) Continuation of application No. 13/692,932, filed on Dec. 3, 2012, now Pat. No. 9,576,274.

(51) Int. Cl.
| | | |
|---|---|---|
| *G06F 7/00* | (2006.01) | |
| *G06F 17/30* | (2006.01) | |
| *G06Q 10/10* | (2012.01) | |
| *G06Q 50/00* | (2012.01) | |

(52) U.S. Cl.
CPC .. *G06F 17/30616* (2013.01); *G06F 17/30867* (2013.01); *G06Q 10/1053* (2013.01); *G06Q 50/01* (2013.01)

(58) Field of Classification Search
CPC ............... G06Q 10/1053; G06F 17/30861

USPC ................................................... 707/999.107
See application file for complete search history.

(56) References Cited

U.S. PATENT DOCUMENTS

| | | |
|---|---|---|
| 9,576,274 B2 | 2/2017 | Burstein et al. |
| 2006/0265270 A1 | 11/2006 | Hyder et al. |
| 2007/0162507 A1 | 7/2007 | Mcgovern et al. |
| 2009/0299993 A1 | 12/2009 | Novack |

(Continued)

OTHER PUBLICATIONS

"U.S. Appl. No. 13/692,932, Examiner Interview Summary dated Jan. 9, 2015", 3 pgs.

(Continued)

*Primary Examiner* — James Trujillo
*Assistant Examiner* — John J Morris
(74) *Attorney, Agent, or Firm* — Schwegman Lundberg & Woessner, P.A.

(57) ABSTRACT

A first user of a presentation machine may be a recruiter that initiates an action in reference to a first user profile. The first user profile may describe a first candidate for a job. The presentation machine may identify the first user profile and determine a similarity score that indicates a degree of similarity between the first user profile and a second user profile that describes a second candidate for the job. The presentation machine may also access a volatility score that indicates a likelihood that the second candidate is receptive to a proposal that the second candidate be employed by an employer. Based on the similarity score and on the volatility score, the presentation machine may determine a rank of the second user profile. Based on the determined rank, the presentation machine may present the second user profile to the first user.

20 Claims, 10 Drawing Sheets

(56) References Cited

U.S. PATENT DOCUMENTS

2012/0079045 A1   3/2012  Plotkin
2012/0197835 A1   8/2012  Costa et al.
2013/0346283 A1  12/2013  Demarest et al.
2014/0143165 A1   5/2014  Posse et al.
2014/0156675 A1   6/2014  Burstein et al.

OTHER PUBLICATIONS

"U.S. Appl. No. 13/692,932, Examiner Interview Summary dated Jul. 5, 2016", 3 pgs.
"U.S. Appl. No. 13/692,932, Examiner Interview Summary dated Dec. 24, 2015", 3 pgs.
"U.S. Appl. No. 13/692,932, Final Office Action dated May 2, 2016", 21 pgs.
"U.S. Appl. No. 13/692,932, Final Office Action dated Oct. 23, 2014", 26 pgs.
"U.S. Appl. No. 13/692,932, Non Final Office Action dated May 9, 2014", 23 pgs.
"U.S. Appl. No. 13/692,932, Non Final Office Action dated Oct. 21, 2015", 21 pgs.
"U.S. Appl. No. 13/692,932, Notice of Allowance dated Nov. 2, 2016", 9 pgs.
"U.S. Appl. No. 13/692,932, Response filed Jan. 21, 2016 to Non-Final Office Action dated Oct. 21, 2015", 12 pgs.
"U.S. Appl. No. 13/692,932, Response filed Jan. 22, 2015 to Final Office Action dated Oct. 23, 2014", 12 pgs.
"U.S. Appl. No. 13/692,932, Response filed Jul. 26, 2016 to Final Office Action dated May 2, 2016", 10 pgs.
"U.S. Appl. No. 13/692,932, Response filed Aug. 4, 2014 to Non Final Office action dated May 9, 2014", 13 pgs.

300

User Profile
(e.g., describing User 162, who may be job candidate, and referenced by action initiated by first user or job recruiter)

310

Employment Descriptor
(e.g., specifying industry, company, job title, number of years of experience, or skill)

320

Employment Descriptor

330

Employment Descriptor

*FIG. 3*

PRESENTING A USER PROFILE

RELATED APPLICATIONS

This application is a Continuation of U.S. patent application Ser. No. 13/692,932, filed on Dec. 3, 2012, which is hereby incorporated by reference in its entirety.

TECHNICAL FIELD

The subject matter disclosed herein generally relates to the processing of data. Specifically, the present disclosure addresses systems and methods to facilitate presentation of the user profile.

BACKGROUND

A machine (e.g., a server machine) may form all or part of a network-based system that provides one or more network-based services to one or more users. To offer personalized or otherwise customized features of the network-based service, the machine may maintain a profile of some or all of the users of the service. In some cases, the machine creates and stores a data structure (e.g., data record within a database) that describes a user, in whole or in part. Such a data structure may be referred to as a "user profile" of the user. For example, the user profile may describe the user by specifying (e.g., by inclusion or by reference) one or more characteristics of the user. Examples of such characteristics include the user's name (e.g., full name or username), address (e.g., home address or email address), age (e.g., birth date), gender (e.g., sex), previous item purchased, previous item viewed, employer, job title, number of years at job, marital status (e.g., single or married), availability for online dating, favorite color, favorite movie, favorite sport, preference for smoking, preference for drinking (e.g., alcoholic beverages), or any suitable combination thereof. In some situations, any user profile may be presented (e.g., displayed), in whole or in part, by the machine (e.g., in response to a request by the user to view or update his profile).

BRIEF DESCRIPTION OF THE DRAWINGS

Some embodiments are illustrated by way of example and not limitation in the figures of the accompanying drawings.

FIG. 3 is a data structure diagram illustrating a user profile that may be referenced by an action that is initiated by a first user (e.g., a job recruiter), according to some example embodiments.

DETAILED DESCRIPTION

Example methods and systems are directed to identification of one or more media sources. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A first user of a presentation machine may be a recruiter that initiates an action in reference to a first user profile. The first user profile may describe a first candidate for a job. The presentation machine may identify the first user profile and determine a similarity score that indicates a degree of similarity between the first user profile and a second user profile that describes a second candidate for the job. The presentation machine may also access a volatility score (e.g., a "flight risk" score) that indicates a likelihood that the second candidate is receptive to a proposal (e.g., from the first user) that the second candidate be employed by an employer (e.g., a new employer). Based on the similarity score and on the volatility score, the presentation machine may determine a rank of the second user profile (e.g., by sorting a ranking the second user profile among other user profiles, for example, obtain a search results from a search query). Based on the determined rank, the presentation machine may present the second user profile to the first user (e.g., to a recruiter that initiated the action referencing the first user profile). Accordingly, the presentation machine may present the second user profile based on the initiated action that references the first user profile, the similarity score, the volatility score, or any suitable combination thereof.

Figure 1:
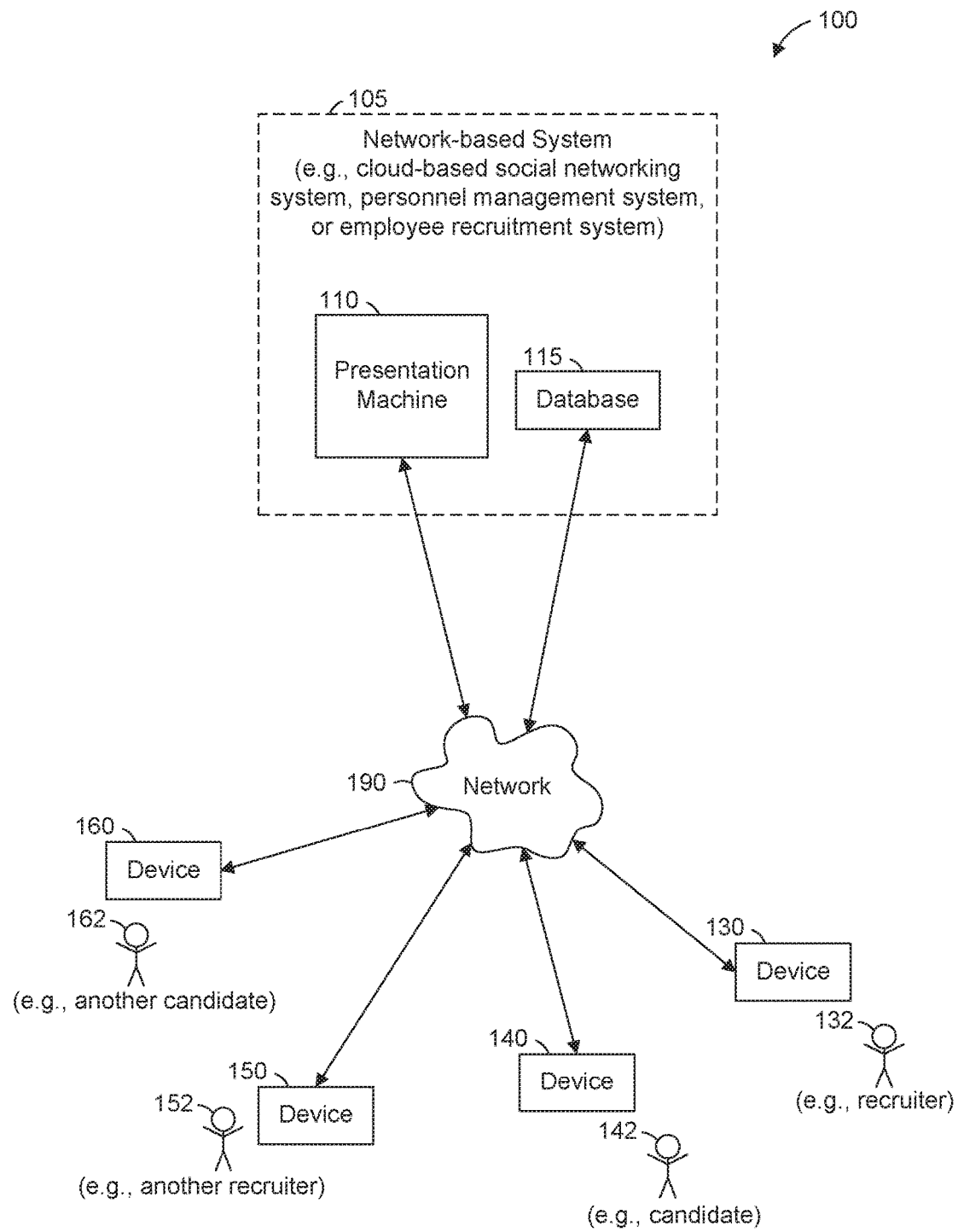
FIG. 1 is a network diagram illustrating a network environment suitable for presenting a user profile, according to some example embodiments.

FIG. 1 is a network diagram illustrating a network environment 100 suitable for presenting a user profile, according to some example embodiments. The network environment 100 includes a presentation machine 110, a database 115, and devices 130, 140, 150, and 160, all communicatively coupled to each other via a network 190. The presentation machine 110, the database 115, and the devices 130, 140, 150, and 160 may each be implemented in a computer system, in whole or in part, as described below with respect to FIG. 10.

As shown in FIG. 1, the presentation machine 110, with or without the database 115, may form all or part of a network-based system 105. Examples of network-based systems (e.g., network-based system 105) include commerce systems (e.g., shopping websites or auction websites), publication systems (e.g., classified advertisement websites), listing systems (e.g., wish list websites or gift registries), transaction systems (e.g., payment websites), and social network systems (e.g., LinkedIn®, Facebook®, or Twitter®). According to various example embodiments, the network-based system 105 may be or include a cloud-based social networking system, a personnel management system, an employee recruitment system, a job advertising system, or any suitable combination thereof. The database 115 may store one or more of the user profiles discussed herein.

Also shown in FIG. 1 are users 132 142, 152, and 162. One or more of the users 132, 142, 152, and 162 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Similarly, the user 142 is not part of the network environment 100, but is associated with the device 140 and may be a user of the device 140. For example, the device 140 may be a desktop computer, a vehicle computer, a tablet computer, a navigational device, a portable media device, or a smart phone belonging to the user 142. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152. Additionally, the user 162 is not part of the network environment 100, but is associated with the device 160 and may be a user of the device 160. As an example, the device 160 may be a desktop computer, a vehicle computer, a tablet computer, a navigational device, a portable media device, or a smart phone belonging to the user 162.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the presentation machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
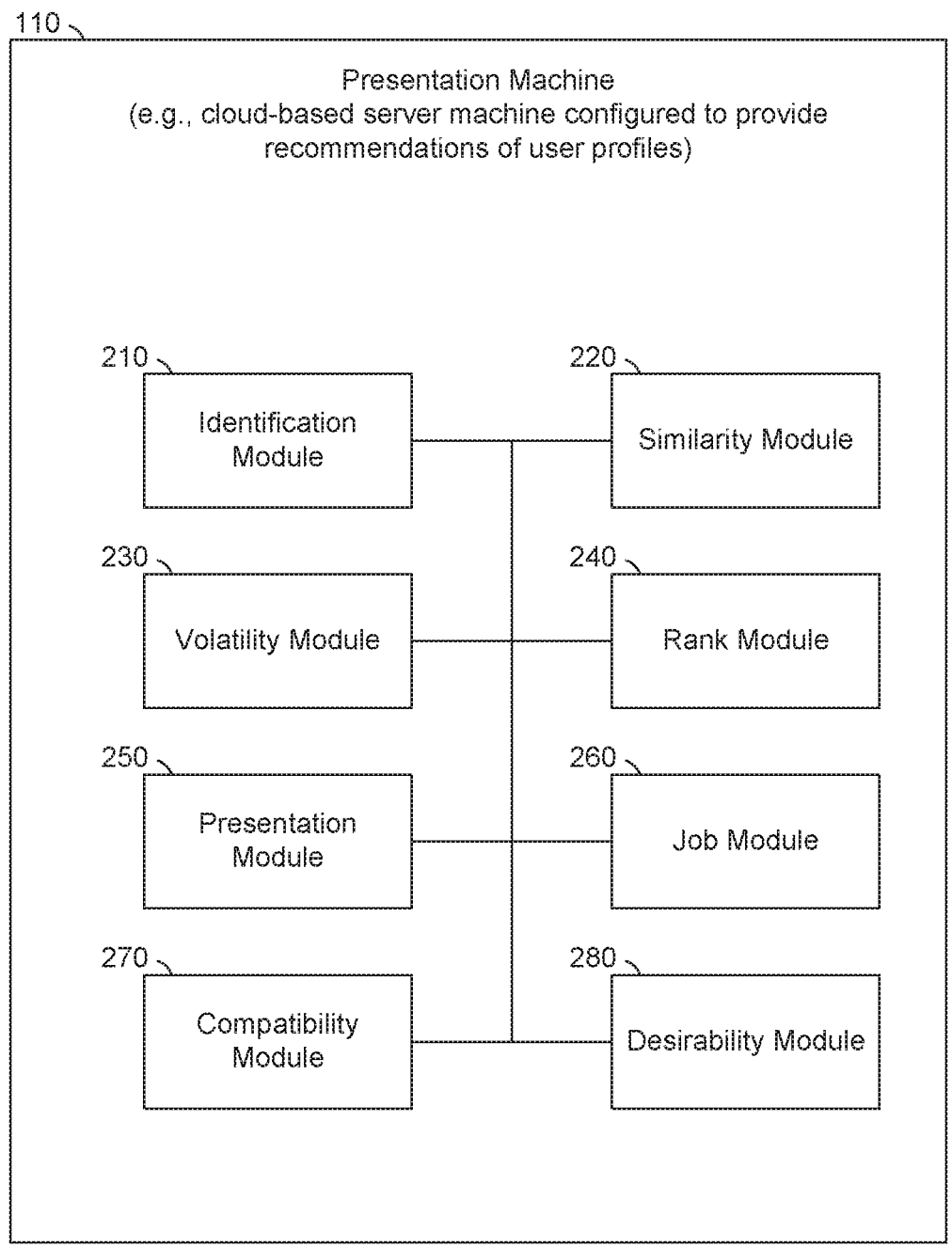
FIG. 2 is a block diagram illustrating components of a presentation machine suitable for presenting a user profile, according to some example embodiments.

FIG. 2 is a block diagram illustrating components of the presentation machine 110, which may be configured to present a user profile, according to some example embodiments. The presentation machine 110 is shown as including a identification module 210, a similarity module 220, a volatility module 230, a rank module 240, and a presentation module 250, all configured to communicate with each other (e.g., via a bus, shared memory, or a switch). According to various embodiments, the presentation machine 110 may include a job module 260, a compatibility module 270, a desirability module 280, or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 3 is a data structure diagram illustrating a user profile 300 (e.g., a first user profile) that may be referenced by an action that is initiated by the user 132 (e.g., a first user), according to some example embodiments. The user 132 may be a recruiter (e.g., a job recruiter, employment consultant, career counselor, human resources manager, staffing assistant, or any suitable combination thereof). The user profile 300 may describe (e.g., in whole or in part) the user 162 (e.g., a second user), who may be a user of the network-based system 105 and a candidate for a job (e.g., an actual job candidate or a potential job candidate).

As shown in FIG. 3, the user profile 300 may be referenced by an action initiated by the user 132 (e.g., first user, who may be a recruiter). The action that references the user profile 300 may indicate interest (e.g., degree of interest) in the user profile 300, the user 162 (e.g., second user, who may be a candidate) described by the user profile 300, or both.

For example, such an action may include sending a message that references the user profile 300 (e.g., sending an email, text message, or voicemail). In some situations, the user 162 (e.g., second user, as a potential candidate) may be sent such a message (e.g., "I hope you won't mind me reaching out to you, but I saw your profile and thought you would be a great candidate for this position" or "I am a recruiting manager representing a very exciting mid-stage startup and thought that someone with your user profile may be interested"). In other situations, a third-party recipient (e.g., a hiring manager) may be sent such a message (e.g., "Wow, this person would fit our current job opening for an engineer" or "Do you want to recruit this person for your business?"). As another example, such an action may include storing a reference to the user profile 300, where such a reference may be stored within a data record that corresponds to the user 132 (e.g., saving the user profile 300 to a list of candidates to be reviewed later by the user 132). As a further example, such an action may include submitting (e.g., to the presentation machine 110) an annotation (e.g., a marker, tag, or flag) that corresponds to the user profile 300 (e.g., bookmarking, tagging, or flagging the user profile 300 as being of interest to the user 132). As a yet further example, such an action may include requesting the user profile 300 (e.g., requesting that some or all of the user profile 300 be presented to the user 132, via the device 130, within a webpage served by the network-based system 105).

In the example shown in FIG. 3, the user profile 300 includes employment descriptors 310, 320, and 330 that describe one or more employment characteristics of the user 162 that corresponds to the user profile 300. One or more of the employment descriptors 310, 320, and 330 may specify an industry (e.g., finance or farming), a company (e.g., IBM® or LinkedIn®), a job title (e.g., accountant or software engineer), a number of years of experience (e.g., 2.5 years or 15 years), a skill (e.g., tax strategy or C++ programming), or any suitable combination thereof. In various example embodiments, the user profile 300 may include any number of such employment descriptors.

Figure 4:
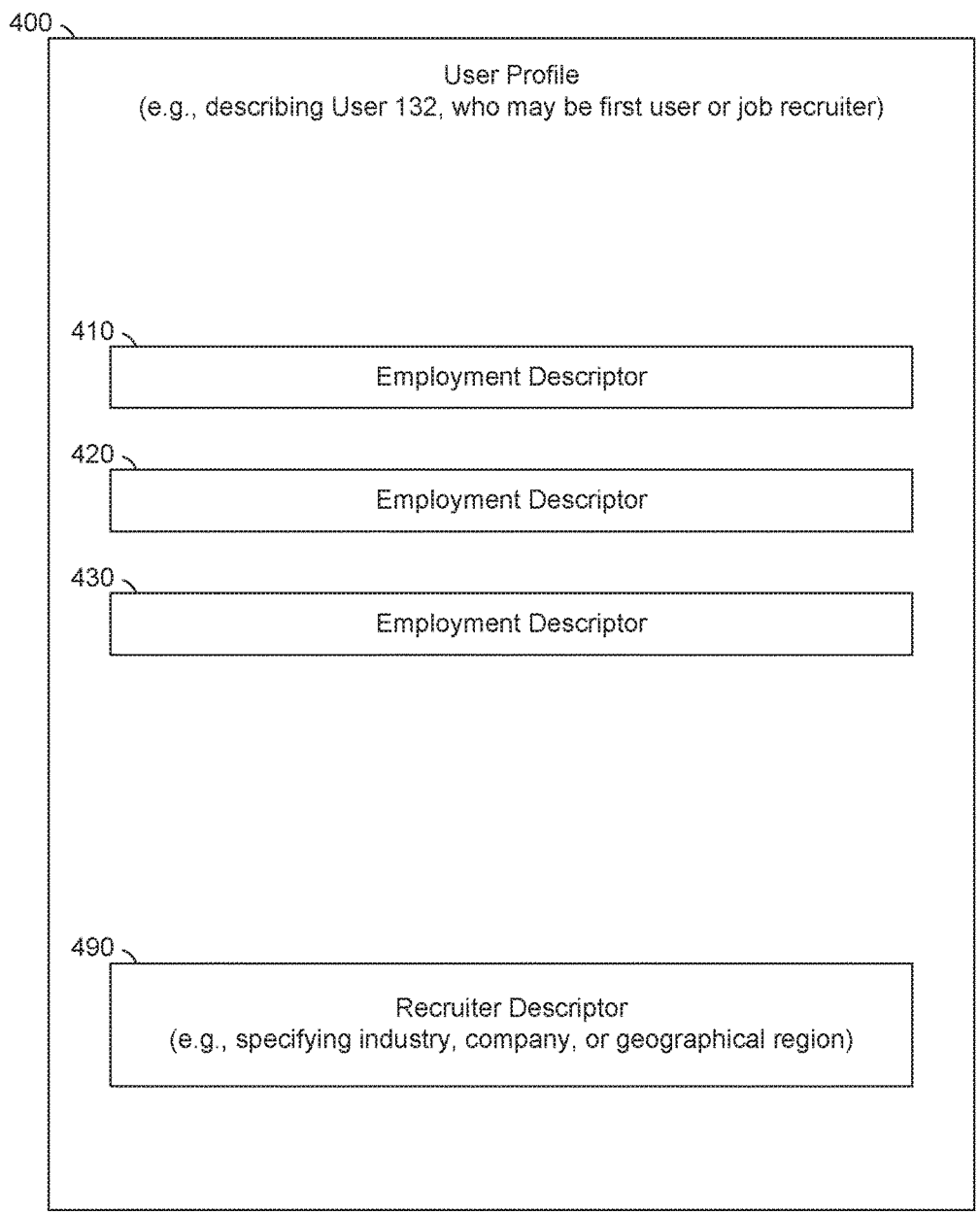
FIG. 4 is a data structure diagram illustrating a user profile that may describe the first user (e.g., job recruiter), according to some example embodiments.

FIG. 4 is a data structure diagram illustrating a user profile 400 that may describe the user 132 (e.g., first user, who may be a recruiter), according to some example embodiments. The user profile 400 may include employment descriptors 410, 420, and 430 that describe one or more employment characteristics of the user 132 that corresponds to the user profile 400. One or more of the employment descriptors 410, 420, and 430 may specify an industry, a company, a job title (e.g., recruiter), a number of years of experience, a skill (e.g., recruitment of technical talent), or any suitable combination thereof. In various example embodiments, the user profile 400 may include any number of such employment descriptors.

In the example shown in FIG. 4, the user profile 400 includes a recruiter descriptor 490 that may describe one or more recruiter characteristics of the user 132 (e.g., first user, who may be a recruiter) that corresponds to the user profile 400. The recruiter descriptor 490 need not describe the user 132 herself. Instead, the recruiter descriptor 490 may describe one or more contexts in which the user 132 functions as a recruiter (e.g., a recruiter of users of the network-based system 105). The recruiter descriptor 490 may specify an industry in which the user 132 works or has knowledge, a company at which the user 132 works or has knowledge, a geographical region (e.g., a country, state, city, or neighborhood) in which the user 132 works or has knowledge, or any suitable combination thereof.

Figure 5:
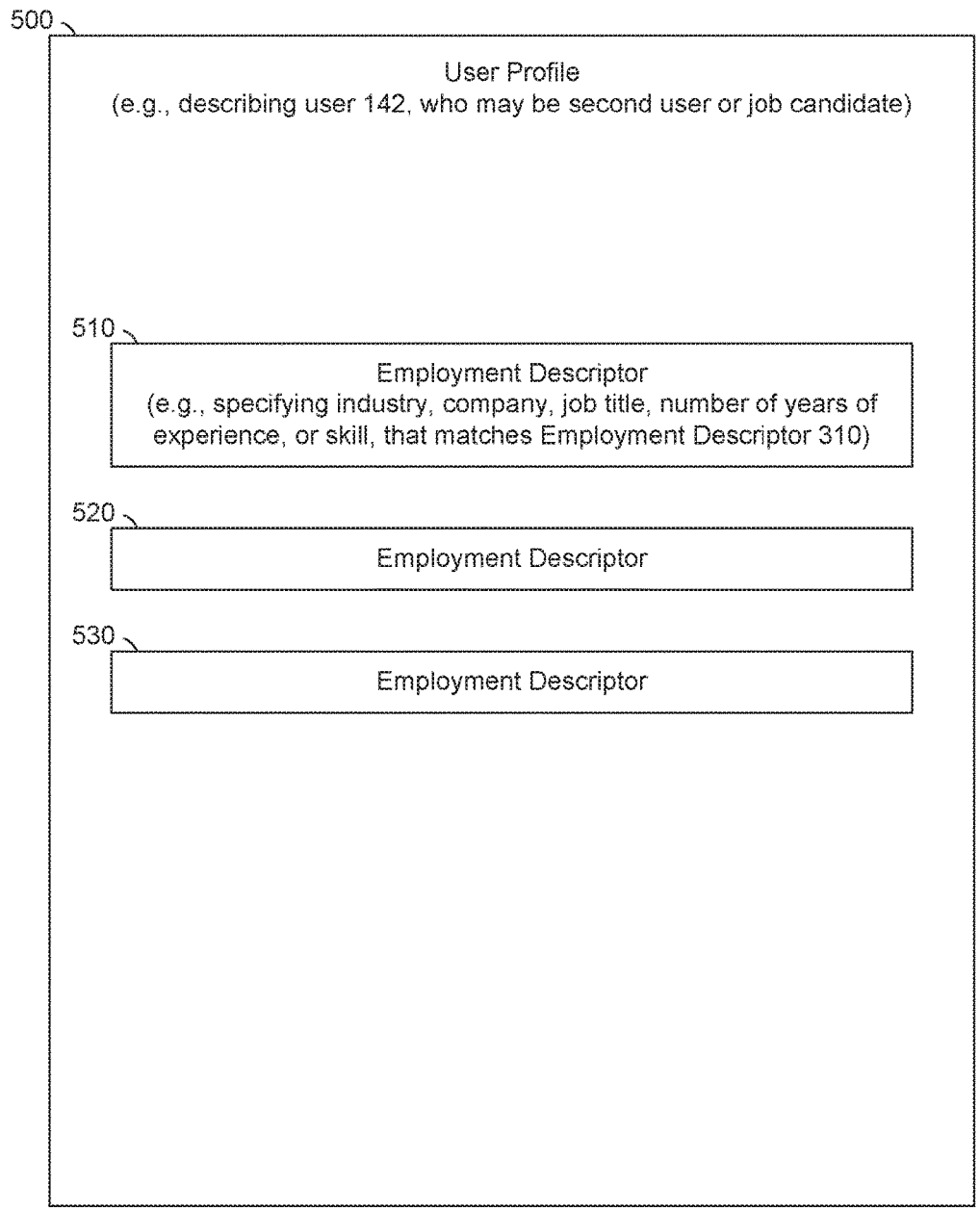
FIG. 5 is a data structure diagram illustrating a user profile that may describe a second user (e.g., job candidate), according to some example embodiments.

FIG. 5 is a data structure diagram illustrating a user profile 500 that may describe the user 142 (e.g., second user), according to some example embodiments. The user 142 may be a candidate for one or more jobs (e.g., jobs for which the user 132 is recruiting). The user profile 500 may describe (e.g., in whole or in part) the user 142, who may be a user of the network-based system 105 and a candidate for a job (e.g., an actual job candidate or a potential job candidate).

In the example shown in FIG. 5, the user profile 500 includes employment descriptors 510, 520, and 530 that describe one or more employment characteristics of the user 142 that corresponds to the user profile 500. One or more of the employment descriptors 510, 520, and 530 may specify an industry, a company, a job title, a number of years of experience, a skill, or any suitable combination thereof. In various example embodiments, the user profile 500 may include any number of such employment descriptors.

As shown in FIG. 5, the employment descriptor 510 may match (e.g., contain a value that is identical or semantically similar to) the employment descriptor 310 in the user profile 300 for the user 162. According to various example embodiments, any one or more of the employment descriptors 510, 520, and 530, may match any one or more of the employment descriptors 310, 320, and 330 (e.g., within a threshold degree of similarity).

Figure 6:
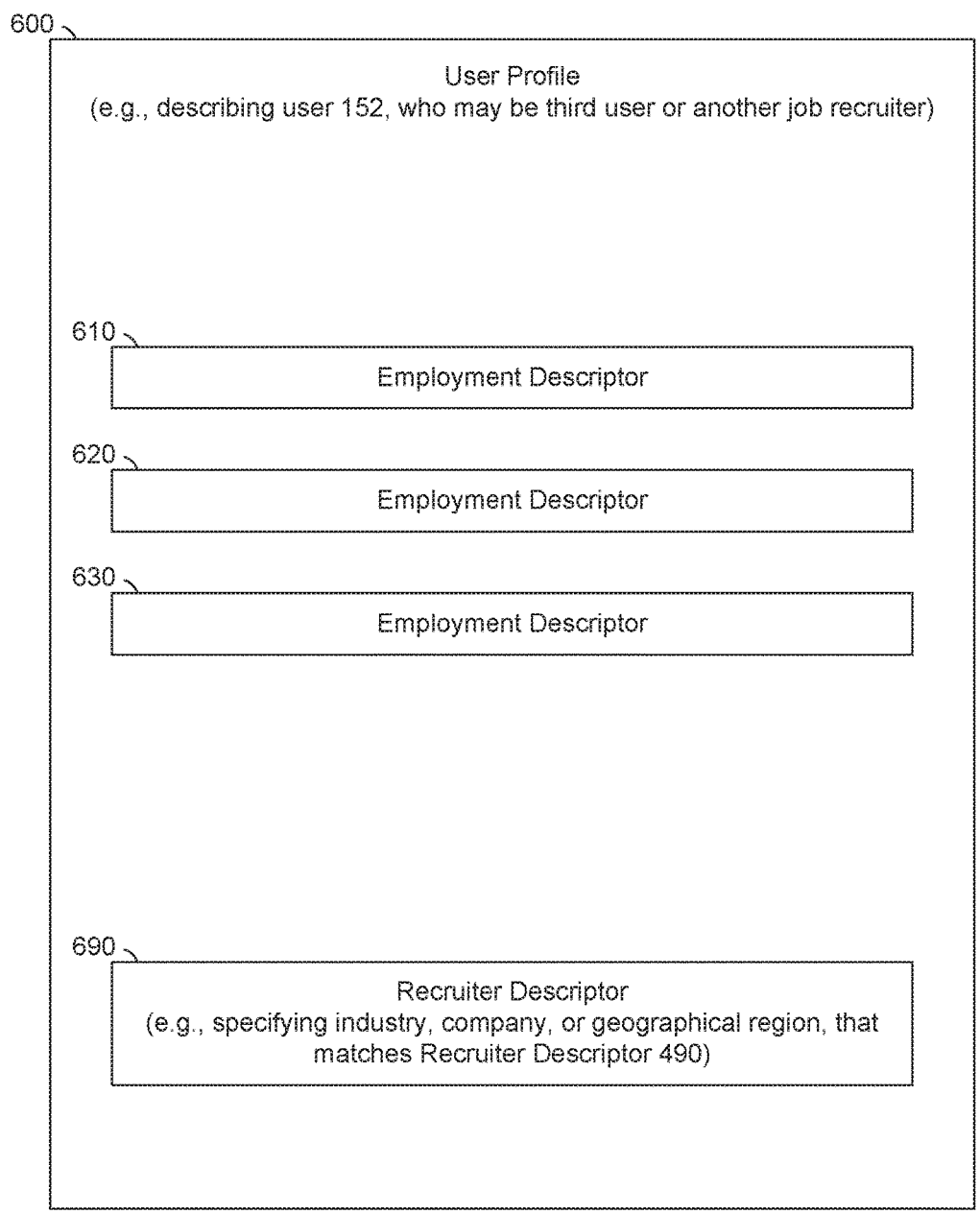
FIG. 6 is a data structure diagram illustrating a user profile that may describe a third user (e.g., a different job recruiter), according some example embodiments.

FIG. 6 is a data structure diagram illustrating a user profile 600 that may describe the user 152 (e.g., a third user), according some example embodiments. The user 152 may be a different recruiter than the user 132 (e.g., first user, who may be a recruiter). The user profile 600 may include employment descriptors 610, 620, and 630 that describe one or more employment characteristics of the user 152 that corresponds to the user profile 600. One or more of the employment descriptors 610, 620, and 630 may specify an industry, a company, a job title (e.g., recruiter), a number of years of experience, a skill (e.g., recruitment of technical or managerial talent), or any suitable combination thereof. In various example embodiments, the user profile 600 may include any number of such employment descriptors.

In the example shown in FIG. 6, the user profile 600 includes a recruiter descriptor 690 that may describe one or more recruiter characteristics of the user 152 that corresponds to the user profile 600. The recruiter descriptor 690 need not describe the user 152 himself. Instead, the recruiter descriptor 690 may describe one or more contexts in which the user 152 functions as a recruiter (e.g., a recruiter of users of the network-based system 105). The recruiter descriptor 690 may specify an industry in which the user 152 works or has knowledge, a company at which the user 152 works or has knowledge, a geographical region (e.g., a country, state, city, or neighborhood) in which the user 152 works or has knowledge, or any suitable combination thereof.

As shown in FIG. 6, the recruiter descriptor 690 may match (e.g., contain a value that is identical or semantically similar to) the recruiter descriptor 490 in the user profile 400 for the user 132. Thus, according to various example embodiments, the recruiter descriptor 690 may match the recruiter descriptor 490 (e.g., within a threshold degree of similarity).

Figure 7:
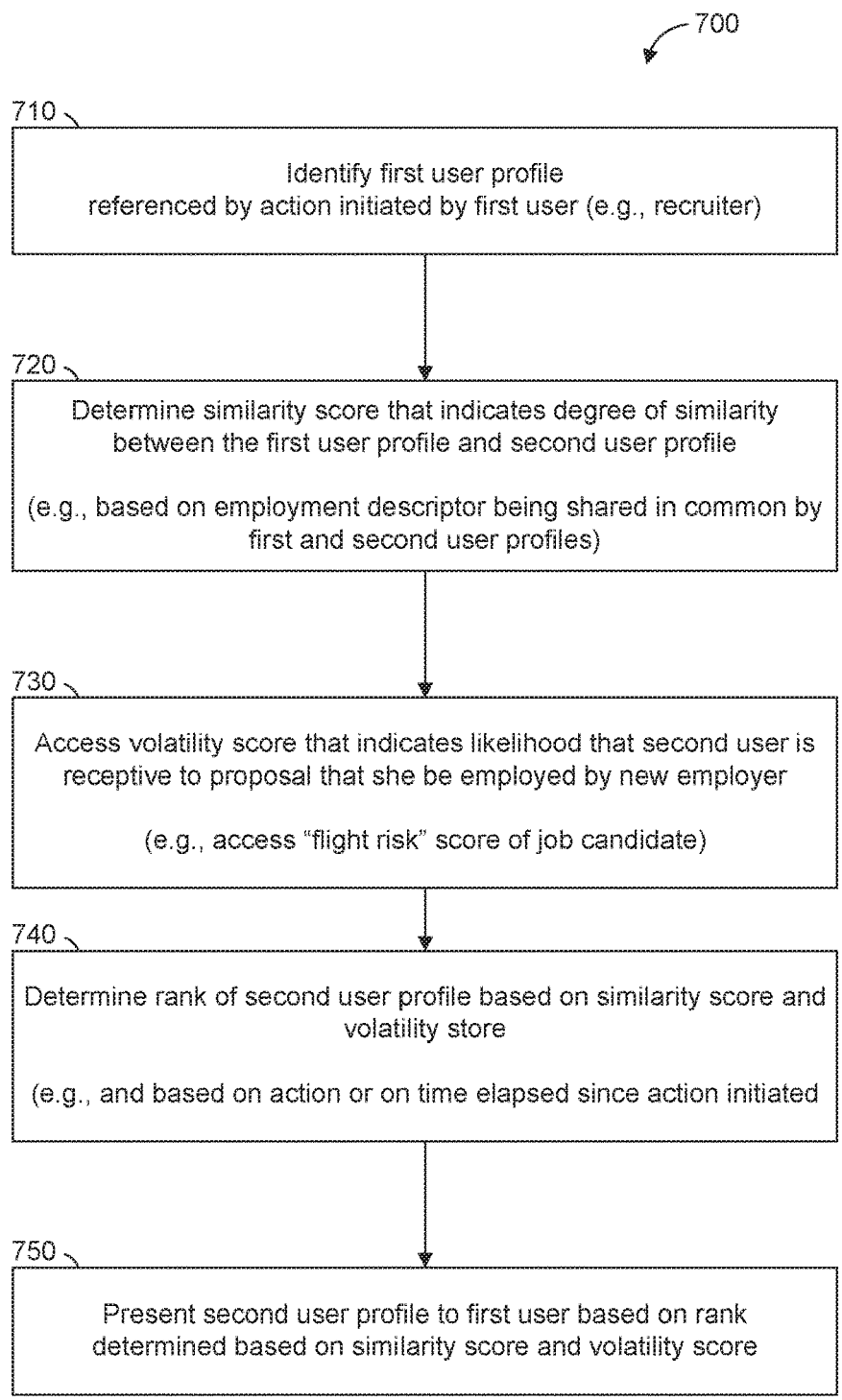
FIG. 7-9 are flowcharts illustrating operations of the presentation machine in performing a method of presenting a user profile, according to some example embodiments.
Figure 8:
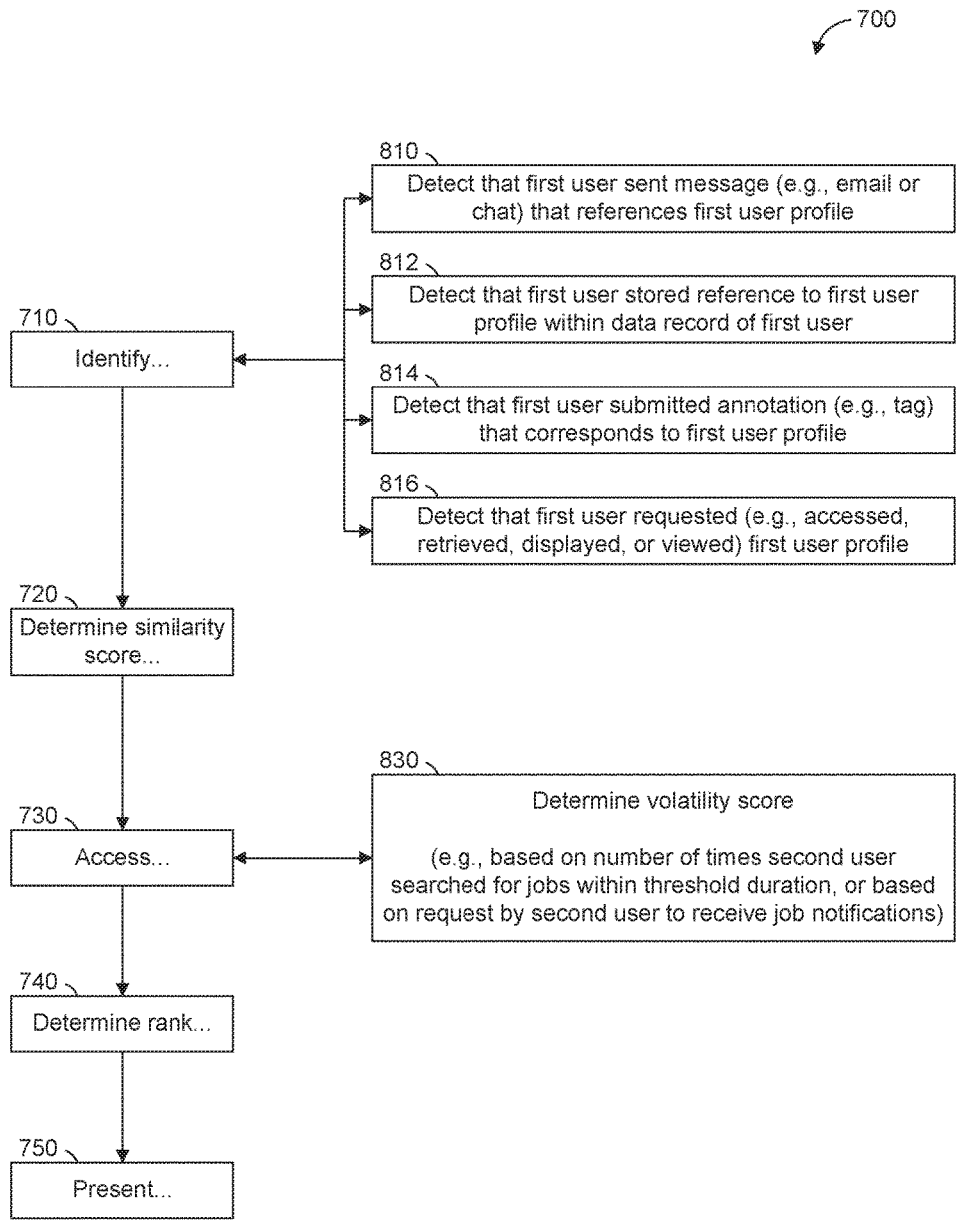
Figure 9:
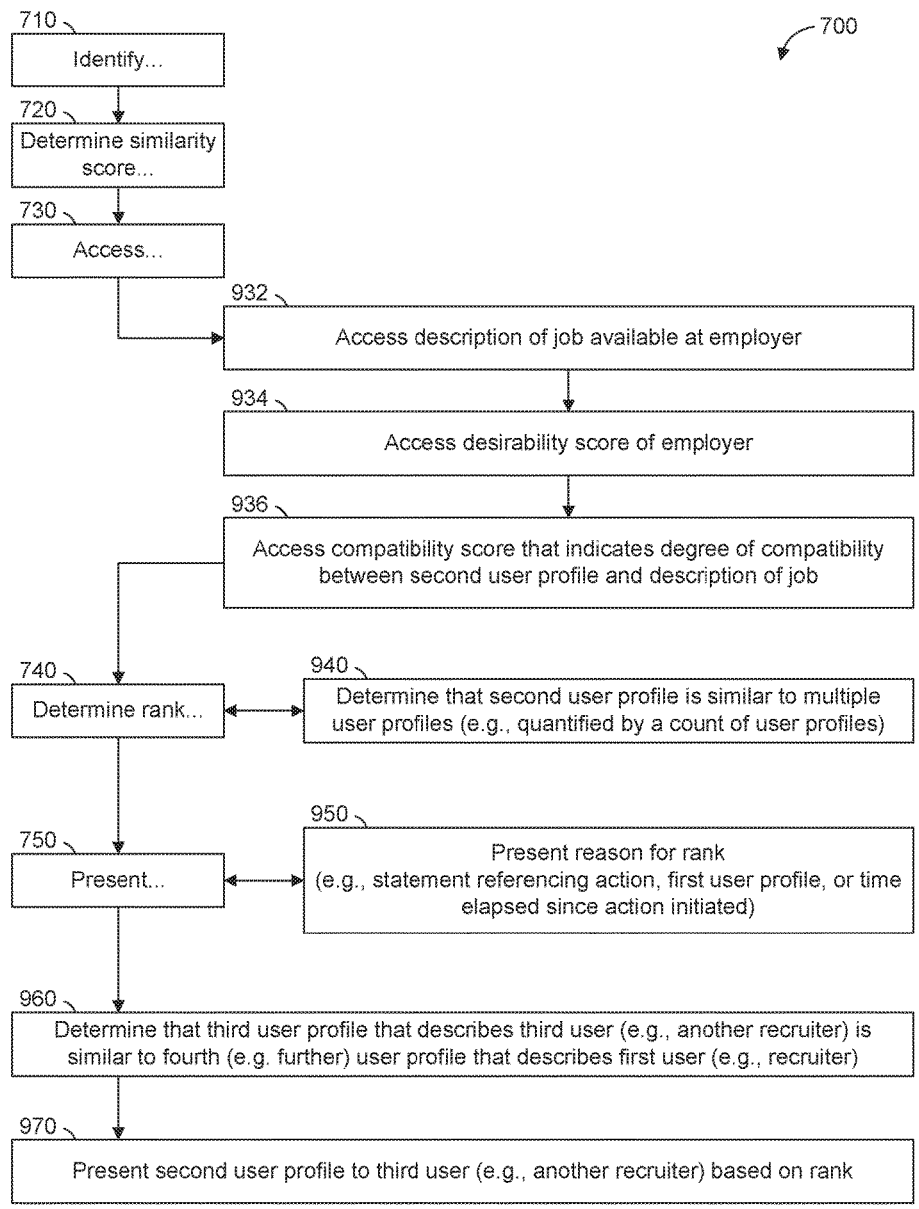

FIG. 7-9 are flowcharts illustrating operations of the presentation machine 110 in performing a method 700 of presenting the user profile 500, according to some example embodiments. Operations in the method 700 may be performed by the presentation machine 110, using modules described above with respect to FIG. 2. In the example shown in FIG. 7, the method 700 may include one or more of operations 710, 720, 730, 740, and 750.

In operation 710, the identification module 210 identifies the user profile 300 (e.g., a first user profile). As noted above, the user profile 300 may be referenced by an action (e.g., sending a message, storing a reference, submitting an annotation, or making a request) that references the user profile 300. The action may be initiated by the user 132 (e.g., first user, who may be a recruiter). In performing operation 710, the identification module 210 may identify the user profile 300 based on the action that references the user profile 300. For example, the identification module 210 may identify the user profile 300 by detecting that the action has been performed (e.g., by the user 132, via the device 130).

In operation 720, the similarity module 220 determines a similarity score. The similarity score may indicate a degree of similarity between the user profile 300 (e.g., first user profile) and the user profile 500 (e.g., second user profile). As noted above, the user profile 500 may describe the user 142 (e.g., second user, who may be a candidate for a job).

In some example embodiments, the determining of the similarity score is based on an employment descriptor (e.g., employment descriptor 310) being shared in common by the user profile 300 (e.g., first user profile) and the user profile 500 (e.g., second user profile). As noted above, the employment descriptor 310 within the user profile 300 may match the employment descriptor 510 within the user profile 500. Accordingly, the employment descriptors 310 and 510 may be a single employment descriptor that is shared in common by the user profiles 300 and 500 (e.g., first and second user profiles). Hence, operation 720 may be performed based on the employment descriptor 310 (or the descriptor 510) being shared in common by the user profile 300 and 500. As noted above, the employment descriptor 310 may specify an industry, a company, a job title, a number of years of experience, or a skill, or any suitable combination thereof.

In operation 730, the volatility module 230 accesses (e.g., requests, retrieves, reads, determines, calculates, or generates) a volatility score of the user 142 (e.g., second user, who may be a candidate for a job). The volatility score of the user 142 may be stored in the user profile 500 (e.g., second user profile). For example, the volatility module 230 may access the volatility score from the database 115. The volatility score may indicate a likelihood (e.g., probability) that the user 142 (e.g., second user) is receptive (e.g., willing to receive or consider) a proposal that the user 142 be employed by an employer (e.g., a new employer distinct from his current employer). That is, the volatility score may indicate a likelihood that the user 142 is willing to change employers, change jobs, or both.

In some example embodiments, the volatility score may be a "flight risk" score, or "flightmeter" score, that is determined (e.g., calculated) based on one or more factors that are statistically correlated with a user (e.g., user 142, as a potential job candidate) looking for a new job or preparing to look for a new job. An example of such a factor is a number of times the user searched for jobs within a threshold duration (e.g., within the previous week, within the previous month, or within the previous year). Other examples of such a factor include employment anniversary date of the user (e.g., a current date being within three months of the user's tenth anniversary working for the user's current employer), a number of years that the user worked for his current employer (e.g., nine years), a request by the user to view a job description (e.g., within a job posting available from the network-based system 105), a request by the user to apply to a job (e.g., via the network-based system 105), a request (e.g., a user preference) by the user to receive notifications of jobs (e.g., alerts that describe available jobs within an industry, a company, or a geographic region), or any suitable combination thereof.

In operation 740, the rank module 240 determines a rank of the user profile 500 (e.g., second user profile). The rank may be determined based on the similarity score determined in operation 720, based on the volatility score accessed in operation 730, or based on both. For example, the rank module 240 may determine a sort order of the user profile 500 (e.g., within a list of user profiles obtained as search results from a search query).

In some example embodiments, the determining of the rank may be based on the action initiated by the user 132 (e.g., first user, who may be recruiter), discussed above with respect to operation 710. For example, the rank may be determined based on (e.g., in response to) the user 132 sending an email message that references the user profile 300 (e.g., to a client of the user 132). As another example, the rank may be determined based on the user 132 storing a reference to the user profile 300 (e.g., within a data record managed by the user 132, such as a spreadsheet, a wish list, a project file, or a reminder). As a further example, the rank may be determined based on the user 132 making an annotation that corresponds to (e.g., references) the user profile 300 (e.g., tagging or marking the user profile 300 for follow-up activity). As a yet further example, the rank may be determined based on the user 132 requesting all or part of the user profile 300.

In certain example embodiments, the determining of the rank may be based on an elapsed time since the user 132 initiated the action. For example, the rank may be determined to be higher for a recent action (e.g., initiated within the past two weeks), compared to an action that was initiated further in the past (e.g., more than three months ago).

In operation 750, the presentation module 250 presents some or all of the user profile 500 (e.g., second user profile) to the user 132 (e.g., first user, who may be a recruiter). The presentation module 250 may present the user profile 500 based on the rank determined in operation 740. For example, the user profile 500, in whole or in part, may be presented within a document that highlights the user profile 500 based on the rank. As another example, the user profile 500 may be presented within a list of user profiles (e.g., retrieved from the database 115 as search results from a search query).

As shown in FIG. 8, the method 700 may include one or more of operations 810, 812, 814, 816, and 830. One or more of operations 810, 812, 814, and 816 may be performed as part (e.g., a precursor task, a subroutine, or a portion) of operation 710, in which the identification module 210 identifies the user profile 300 (e.g., first user profile) that is referenced by the action initiated by the user 132 (e.g., first user, who may be a recruiter).

In example embodiments that include operation 810, the action initiated by the user 132 includes sending a message (e.g., an email, text message, voice message, instant message, or chat message) that references all or part of the user profile 300 (e.g., first user profile). In operation 810, the identification module 210 detects that the user 132 sent the message that references the user profile 300 (e.g., to a client of the user 132, via the network-based system 105).

In example embodiments that include operation 812, the action initiated by the user 132 includes storing a reference (e.g., an identifier, a pointer, or link) to the user profile 300 within a data record (e.g., a spreadsheet, a wish list, a project file, or reminder) that corresponds to the user 132 (e.g., within the database 115). In operation 812, the identification module 210 detects that the user 132 stored the reference to the user profile 300 within the data record (e.g., stored in the database 115).

In example embodiments that include operation 814, the action initiated by the user 132 includes submitting an annotation (e.g., a marker, tag, or flag) that corresponds to (e.g., references) the user profile 300. The annotation may be submitted (e.g., communicated) to the network-based system 105 or any part thereof (e.g., presentation machine 110 or database 115). In operation 814, the identification module 210 detects that the user 132 submitted the annotation that corresponds to the user profile 300.

In example embodiments that include operation 816, the action initiated by the user 132 includes requesting the user profile 300, in whole or in part. Some or all of the user profile 300 may be requested (e.g., for access or retrieval) via the device 130 from the network-based system 105 or any part thereof (e.g., presentation machine 110 or database 115). In operation 816, the identification module 210 detects that the user 132 requested at least a portion of the user profile 300.

Operation 830 may be performed as part (e.g., a precursor task, a subroutine, or a portion) of operation 730, in which the volatility module 230 accesses the volatility score of the user 142 (e.g., second user, who may be an actual or potential candidate for a job). In operation 830, the volatility module 230 determines the volatility score. As noted above, the volatility score of the user 142 may be determined based on a number of times the user 142 searched for jobs within a threshold duration (e.g., within the previous week, within the previous month, or within the previous year). As also noted above, the volatility score may be determined based on an employment anniversary date of the user 142, a number of years that the user 142 worked for his current employer, a request by the user 142 to view a job description, a request by the user 142 to apply to a job, a request by the user 142 to receive notifications of jobs, or any suitable combination thereof.

As shown in FIG. 9, the method 700 may include one or more of operations 932, 934, 936, 940, 950, 960, and 970. One or more of operations 932, 934, and 936 may be performed prior to operation 740, in which the rank module 240 determines the rank of the user profile 500 (e.g., second user profile, describing user 142, who may be a candidate for a job).

In operation 932, the job module 260 accesses (e.g., from the database 115) a description of a job. The job may be available at an employer (e.g., a company or other business entity), and the description of the job may be submitted (e.g., to the database 115) by the user 132 (e.g., first user, who may be a recruiter for the employer). In some example embodiments, the user 132 may submit the description of the job as part of the action that references the user profile 300, discussed above with respect to operation 710. For example, the user 132 may be a recruiter for the employer, and the network-based system 105 may provide a user interface that allows the user 132 to communicate an advertisement for the job (e.g., job posting) along with a list of potential candidates (e.g., for subsequent contact), where the list includes a reference to the user profile 300. Accordingly, the user 132 may use such a user interface to submit the advertisement for the job along with the list that references the user profile 300. In certain example embodiments, the user 132 may submit the description of the job separately from the action that references the user profile 300, discussed above with respect to operation 710. As an example, the user 132 may be a recruiter for multiple employers and submit to the network-based system 105 multiple job postings for jobs at the various employers, before later searching for potential candidates and sending a message that references the user profile 300.

In operation 934, the desirability module 280 accesses (e.g., from the database 115) a desirability score of the employer at which the job (e.g., described by the job description accessed in operation 932) is available. The desirability score indicates a degree to which employees of the employer, job candidates applying to the employer, or both, would find the employer desirable. For example, the desirability score may indicate a probability that employees and candidates will want to work for the employer. The desirability score may be determined (e.g., estimated, calculated, or generated) based on various factors, such as industry, location, reputation, compensation, health benefits, retirement plans, corporate culture, products, services, marketing, work-life balance, or any suitable combination thereof. In some example embodiments, the desirability module 280 accesses the desirability score from the database 115. In certain example embodiments, the desirability module 280 calculates the desirability score prior to accessing the desirability score. In example embodiments that include operation 934, the determining of the rank of the user profile 500 in operation 740 may be performed based on the desirability score of the employer.

In operation 936, the compatibility module 270 accesses (e.g., from the database 115) a compatibility score. The compatibility score may indicate a degree of compatibility between the user profile 500 (e.g., second user profile) and the job description accessed in operation 932. For example, the compatibility score may indicate a probability that the user 142, who is described by the user profile 500, can or will competently perform the job described by the description accessed in operation 932. As another example, the compatibility score may indicate a probability that the user 142 can or will enjoy the job. In hybrid example embodiments, the compatibility score indicates a combination of these two probabilities. The compatibility score may be determined based on various factors (e.g., descriptors) being shared in common between the user profile 500 and the description of the job. Examples of such factors include skills, experience, specialties, qualifications, academic achievements (e.g., degrees awarded), working hours, industry, location, compensation, health benefits, retirement plans, corporate culture, products, services, work-life balance, or any suitable combination thereof. To some example embodiments, the compatibility module 270 accesses the compatibility score from the database 115. In certain example embodiments, the compatibility module 270 calculates the compatibility score prior to accessing the compatibility score. In example embodiments that include operation 936, the determining of the rank of the user profile 500 in operation 740 may be performed based on the compatibility score.

According to some example embodiments, the determining of the rank of the user profile 500 (e.g., second user profile) in operation 740 may be based on (e.g., further based on) the user profile 500 being similar to multiple user profiles (e.g., stored in the database 115). For example, the presentation machine 110 may implement an algorithm that treats unique or unusual user profiles as being descriptive of users who are less likely to seek a new employer than users described by user profiles that are more mainstream or commonplace. Accordingly, operation 940 may be performed as part (e.g., a precursor task, a subroutine, or a portion) of operation 740.

In operation 940, the rank module 240 determines that the user profile 500 (e.g., second user profile, describing user 142, who may be a job candidate) is similar to a cluster of multiple user profiles (e.g., stored in the database 115). As an example, the rank module 240 may determine that the user profile 500 is a member of the cluster of user profiles, where each user profile in the cluster shares one or more employment descriptors (e.g., employment descriptor 310 and employment descriptor 510) in common with the other user profiles in the cluster. Accordingly, operation 740 may determine the rank of the user profile 500 based on the user profile 500 being included in the cluster of similar user profiles. Moreover, the size of the cluster may be a factor in ranking the user profile 500. Hence, operation 740 may be performed based on a count of the multiple user profiles within the cluster (e.g., a count of the user profiles to which the user profile 500 is determined to be similar).

According to certain example embodiments, the presenting of the user profile 500 (e.g., second user profile) in operation 750 may include presenting a reason (e.g., for presenting the user profile 500, for ranking the user profile 500, or for both). Accordingly, operation 950 may be performed as part (e.g., a precursor task, a subroutine, or a portion) of operation 750.

In operation 950, the presentation module 250 presents a reason (e.g., a statement, explanation, or notification) that references the action initiated by the user 132 (e.g., as discussed above with respect to operation 710), the user profile 300 that was referenced by the action, a time elapsed since the action was initiated (e.g., by the user 132, via the device 130), or any suitable combination thereof. This combination of operations 950 and 750 may have the effect of presenting the user profile 500 (e.g., second user profile, describing user 142, who may be a candidate for a job) along with an explanatory statement or phrase that gives one or more reasons for presenting their user profile 500, ranking the user profile 500, or otherwise bringing the user profile 500 to the attention of the user 132 (e.g., first user).

As shown in FIG. 9, operations 960 and 970 may be performed after operation 740, after operation 750, or after both. In operation 960, the similarity module 220 determines that the user profile 600 (e.g., third user profile, describing user 152, who may be a recruiter different than user 132) is similar to the user profile 400 (e.g., a further user profile, describing user 132). For example, the user profiles 600 and 400 may be determined to be similar based on sharing one or more recruiter descriptors (e.g., recruiter descriptors 690 and 490) in common. This may have the effect of identifying the user 152 (e.g., third user) as a recruiter who is similar to the user 132 (e.g., first user).

In operation 970, the presentation module 250 presents the user profile 500 (e.g., second user profile, describing user 142, who may be a job candidate) to the user 152 (e.g., third user, who may be a recruiter different than user 132). For example, the presentation module 250 may present the user profile 500 via the device 150 to the user 152. Moreover, the presentation of the user profile 500 to the user 152 (e.g., third user) may be based on the rank of the user profile 500 (e.g., second user profile) determined in operation 740. Accordingly, the presentation module 250 may present the user profile 500 to similar recruiters (e.g., user 132 and user 152) based on the rank determined in operation 740. For example, both recruiters (e.g., users 132 and 152) may be presented with the user profile 500 at the same rank (e.g., ranked first within a list of 25 user profile). As another example, where the user 132 is a recruiter with an active (e.g., fully paid) membership to use the network-based system 105, but the user 152 is a recruiter with an inactive (e.g., unpaid) membership to use the network-based system 105, the user profile 500 may be presented to the user 132 at the actual rank determined in operation 740 (e.g., ranked first in a list of 25 user profiles) and presented to the user 152 a predetermined number of ranks (e.g., five ranks) below the actual rank determined in operation 740 (e.g., ranked sixth in the list of 25 user profiles).

According to various example embodiments, one or more of the methodologies described herein may facilitate presentation of a user profile (e.g., for purposes of job recruiting or other matchmaking activities). Moreover, one or more of the methodologies described herein may facilitate identification and presentation of a user profile based on a similarity score of the user profile, a volatility score of the user profile, the desirability score of the employer, a compatibility score of the user profile, or any suitable combination thereof. Hence, one or more of the methodologies described herein may facilitate retrieval and presentation of a user profile that describes a user who is likely to be receptive to job recruiting or other matchmaking activities.

When these effects are considered in aggregate, one or more of the methodologies described herein may obviate a need for certain efforts or resources that otherwise would be involved in presenting a user profile. Efforts expended by a recruiter in identifying high-value user profiles may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 10:
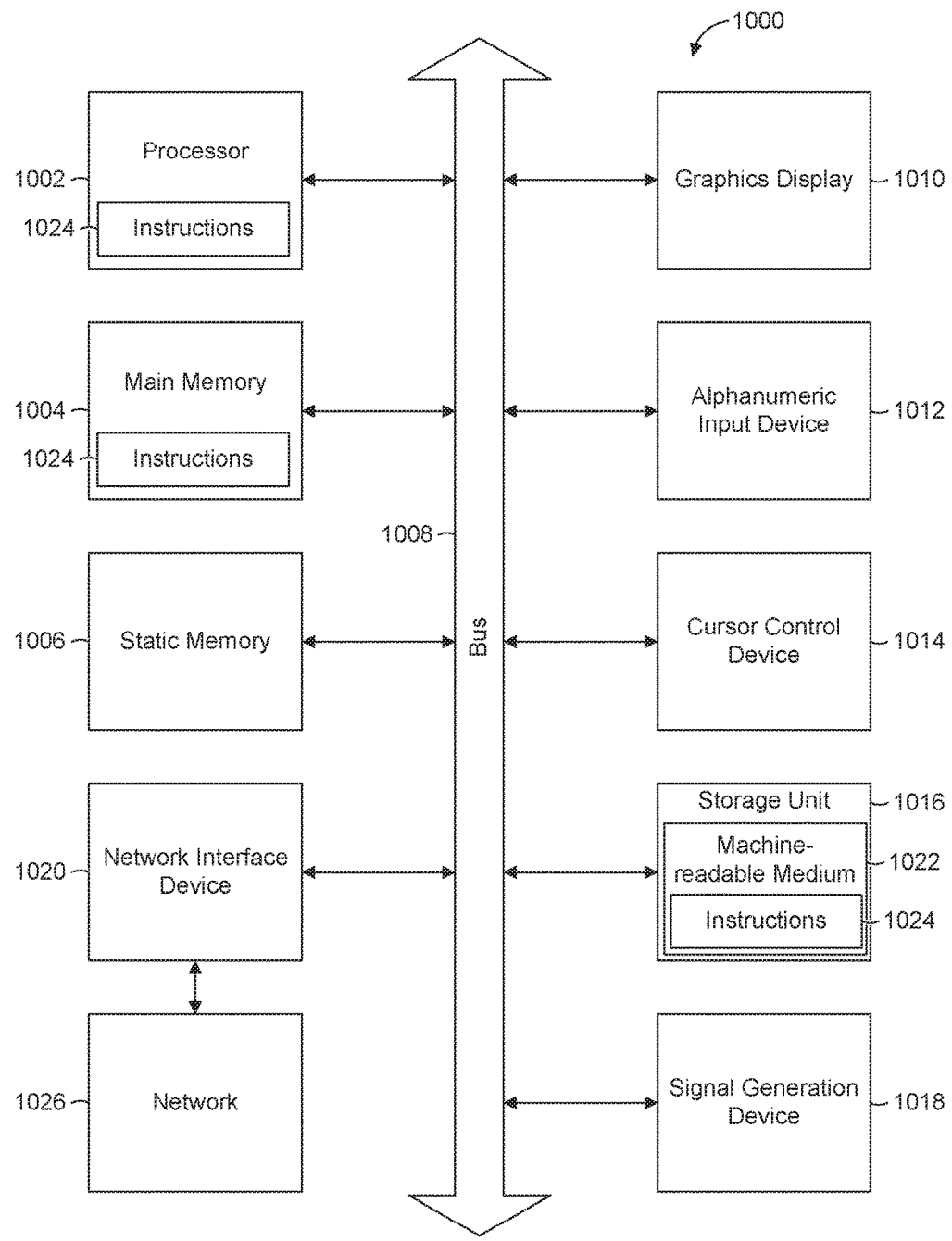
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 10 shows a diagrammatic representation of the machine 1000 in the example form of a computer system and within which instructions 1024 (e.g., software, a program, an application, an applet, an app, or other executable code) for causing the machine 1000 to perform any one or more of the methodologies discussed herein may be executed, in whole or in part. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include a collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered as machine-readable media. The instructions 1024 may be transmitted or received over a network 1026 (e.g., network 190) via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1000), such that the instructions, when executed by one or more processors of the machine (e.g., processor 1002), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein. "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data." "content," "bits," "values," "elements," "symbols," "characters." "terms," "numbers," "numerals." or the like. These words, however, are merely convenient labels and are to be associated with appropriate physical quantities.

Unless specifically stated otherwise, discussions herein using words such as "processing," "computing." "calculating." "determining." "presenting," "displaying." or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods, machine-readable media, and systems (e.g., apparatus) discussed herein:

1. A method comprising:
identifying a first user profile referenced by an action initiated by a first user; determining a similarity score that indicates a degree of similarity between the first user profile and a second user profile that describes a second user;
accessing a volatility score that indicates a likelihood that the second user is receptive to a proposal that the second user be employed by an employer;
determining a rank of the second user profile based on the similarity score and on the volatility score, the determining of the rank being performed by a processor of a machine; and
presenting the second user profile to the first user based on the rank.

2. The method of description 1, wherein:
the action initiated by the first user includes sending a message that references the first user profile; and
the identifying of the first user profile includes detecting that the first user sent the message that references the first user profile.

3. The method of description 1 or description 2, wherein:
the action initiated by the first user includes storing a reference to the first user profile within a data record that corresponds to the first user; and
the identifying of the first user profile includes detecting that the first user stored the reference to the first user profile within the data record that corresponds to the first user.

4. The method of any of descriptions 1-3, wherein:
the action initiated by the first user includes submitting an annotation that corresponds to the first user profile; and
the identifying of the first user profile includes detecting that the first user submitted the annotation that corresponds to the first user profile.

5. The method of any of descriptions 1-4, wherein:
the action initiated by the first user includes requesting the first user profile; and
the identifying of the first user profile includes detecting that the first user requested the first user profile.

6. The method of any of descriptions 1-5, wherein:
the determining of the similarity score is based on an employment descriptor being shared in common by the first user profile and the second user profile, the employment descriptor specifying at least one of an industry, a company, a job title, a number of years of experience, or a skill.

7. The method of any of descriptions 1-6, wherein:
the accessing of the volatility score includes determining the volatility score based on a number of times the second user searched for jobs within a threshold duration.

8. The method of any of descriptions 1-7, wherein:
the accessing of the volatility score includes determining the volatility score based on at least one of: an employment anniversary date of the second user, a number of years that the second user worked for an employer, a request by the second user to view a job posting, a request by the second user to apply to a job, a request by the second user to receive notifications of jobs within at least one of an industry, a company, or a geographic region.

9. The method of any of descriptions 1-8, wherein:
the determining of the rank of the second profile is based on the action initiated by the first user.

10. The method of any of descriptions 1-9, wherein:
the determining of the rank of the second user profile is based on a time elapsed since the first user initiated the action.

11. The method of any of descriptions 1-10 further comprising:
accessing a description of a job available at an employer, the description being submitted by the first user; and
accessing a desirability score of the employer at which the job is available; and wherein
the determining of the rank of the second user profile is based on the desirability score of the employer.

12. The method of any of descriptions 1-10 further comprising:
accessing a description of a job available at an employer, the description being submitted by the first user; and
accessing a compatibility score that indicates a degree of compatibility between the second user profile and the description of the job; and wherein
the determining of the rank of the second user profile is based on the compatibility score.

13. The method of any of descriptions 1-12, wherein:
the determining of the rank of the second user profile includes determining that the second user profile is similar to multiple user profiles; and
the determining of the rank is based on a count of the multiple user profiles to which the second user profile is similar.

14. The method of any of descriptions 1-13, wherein:
the presenting of the second user profile includes presenting a reason that references at least one of the action, the first user profile, or a time elapsed since the first user initiated the action.

15. The method of any of descriptions 1-14 further comprising:
determining that a third user profile that describes a third user is similar to a further user profile that describes the first user; and
presenting the second user profile to the third user based on the rank.

16. The method of description 15, wherein:
the determining that the third user profile is similar to the further profile is based on a recruiter descriptor being shared in common by the third user profile and the further user profile, the recruiter descriptor specifying at least one of an industry, a company, or a geographical region.

17. A non-transitory machine-readable storage medium comprising instructions that, when executed by one or more processors of a machine, cause the machine to perform operations comprising:
identifying a first user profile referenced by an action initiated by a first user; determining a similarity score that indicates a degree of similarity between the first user profile and a second user profile that describes a second user;
accessing a volatility score that indicates a likelihood that the second user is receptive to a proposal that the second user be employed by an employer;
determining a rank of the second user profile based on the similarity score and on the volatility score, the determining of the rank being performed by the one or more processors of the machine; and
presenting the second user profile to the first user based on the rank.

18. The non-transitory machine-readable storage medium of description 17, wherein the operations further comprise:
accessing a description of a job available at an employer, the description being submitted by the first user; and
accessing a desirability score of the employer at which the job is available; and wherein
the determining of the rank of the second user profile is based on the desirability score of the employer.

19. A system comprising:
an identification module configured to identify a first user profile referenced by an action initiated by a first user;
a similarity module configured to determine a similarity score that indicates a degree of similarity between the first user profile and a second user profile that describes a second user;
a volatility module configured to access a volatility score that indicates a likelihood that the second user is receptive to a proposal that the second user be employed by an employer;
a processor configured by a rank module to determine a rank of the second user profile based on the similarity score and on the volatility score; and
a presentation module configured to present the second user profile to the first user based on the rank.

20. The system of description 19 further comprising:
a job module configured to access a description of a job available at an employer, the description being submitted by the first user; and
a compatibility module configured to access a compatibility score that indicates a degree of compatibility between the second user profile and the description of the job; and wherein the rank module configures the processor to determine the rank of the second user profile based on the compatibility score.

What is claimed is:

1. A method comprising:
accessing, by one or more processors, a first profile of a first member of a social network, the first profile being accessed in response to an action that references at least part of the first profile;
determining, by one or more of the processors, a similarity score that quantifies similarity between the first profile and a second profile of a second member of the social network;
ranking, by one or more of the processors, the second profile of the second member based on the determined similarity score and based on an elapsed time since the action that references at least the part of the first profile; and
presenting, by one or more of the processors, the second profile based on the ranking of the second profile.

2. The method of claim 1, wherein:
the action in response to which the first profile of the first number is accessed includes communication of a message that references the part of the first profile; and
the ranking of the second profile of the second member is based on the elapsed time since the communication of the message that references the part of the first profile.

3. The method of claim 1, wherein:
the action in response to which the first profile of the first number is accessed includes storage of a reference to the first profile within a data record of a user; and
the ranking of the second profile of the second member is based on the elapsed time since the storage of the referenced the first profile within the data record of the user.

4. The method of claim 1, wherein:
the action in response to which the first profile of the first number is accessed includes submission of an annotation that corresponds to the first profile; and
the ranking of the second profile of the second member is based on the elapsed time since the submission of the annotation that corresponds to the first profile.

5. The method of claim 1, wherein:
the action in response to which the first profile of the first number is accessed includes submission of an annotation that indicates interest in the first profile; and
the ranking of the second profile of the second member is based on the elapsed time since the submission of the annotation that indicates interest in the first profile.

6. The method of claim 1, wherein:
the action in response to which the first profile of the first number is accessed includes submission of a request that at least the part of the first profile be provided; and
the ranking of the second profile of the second member is based on the elapsed time since the submission of the request that at least the part of the first profile be provided.

7. The method of claim 1, wherein:
the determining of the similarity score includes quantifying the similarity between the first and second profiles based on existence of an employment descriptor that is shared in common by the first and second profiles.

8. The method of claim 1, wherein:
the determining of the similarity score includes quantifying the similarity between the first and second profiles based on existence of an employment descriptor that is shared in common by the first and second profiles and specifies at least one of an industry, a company, a job title, a level of experience, or a skill shared in common by the first and second profiles.

9. The method of claim 1, wherein:
the ranking of the second profile of the second member is based on a number of times that the second member performed job searches within a threshold duration.

10. The method of claim 1, wherein:
the ranking of the second profile the second member is based on detection of a request by the second member to view a job description.

11. The method of claim 1, wherein:
the ranking of the second profile the second member is based on detection of a request by the second member to apply for a job.

12. The method of claim 1, wherein:
the ranking of the second profile the second member is based on detection of a request by the second member to receive job notifications.

13. The method of claim 1, further comprising:
accessing a compatibility score that indicates a degree of compatibility between the second profile and a job description; and wherein
the ranking of the second profile of the second member is based on the accessed compatibility score that indicates the degree of compatibility between the second profile and the job description.

14. The method of claim 13, further comprising:
accessing a desirability score that quantifies desirability of an employer that corresponds to the job description; and wherein
the ranking of the second profile of the second member is based on the accessed desirability score that quantifies the desirability of the employer that corresponds to the job description.

15. The method of claim 1, further comprising:
accessing a count of further profiles of further members of the social network, the count indicating a size of a cluster of profiles that includes the second profile of the second member; and wherein
the ranking of the second profile of the second member is based on the count that indicates the size of the cluster profiles that includes the second profile of the second member.

16. The method of claim 1, wherein:
the presenting of the second profile of the second member includes presenting an indication of the action that references at least the part of the first profile of the first member.

17. A non-transitory machine-readable storage medium comprising instructions that, when executed by one or more processors of a machine, cause the machine to perform operations comprising:
accessing a first profile of a first member of a social network, the first profile being accessed in response to an action that references at least part of the first profile;
determining a similarity score that quantifies similarity between the first profile and a second profile of a second member of the social network;
ranking the second profile of the second member based on the determined similarity score and based on an elapsed time since the action that references at least the part of the first profile; and
presenting the second profile based on the ranking of the second profile.

18. The non-transitory machine-readable storage medium of claim 17, wherein:
the presenting of the second profile of the second member includes presenting an indication of the elapsed time since the action that references at least the part of the first profile.

19. A system comprising:
one or more processors; and
a memory storing instructions that, when executed by at least one processor among the one or more processors, cause the system to perform operations comprising:
accessing a first profile of a first member of a social network, the first profile being accessed in response to an action that references at least part of the first profile;
determining a similarity score that quantifies similarity between the first profile and a second profile of a second member of the social network;
ranking the second profile of the second member based on the determined similarity score and based on an elapsed time since the action that references at least the part of the first profile; and
presenting the second profile based on the ranking of the second profile.

20. The system of claim 19, wherein:
the action in response to which the first profile of the first number is accessed includes submission of an annotation that corresponds to the first profile; and
the ranking of the second profile of the second member is based on the elapsed time since the submission of the annotation that corresponds to the first profile.

* * * * *

UNITED STATES PATENT AND TRADEMARK OFFICE
CERTIFICATE OF CORRECTION

PATENT NO. : 10,127,305 B2
APPLICATION NO. : 15/401554
DATED : November 13, 2018
INVENTOR(S) : Burstein et al.

Page 1 of 1

It is certified that error appears in the above-identified patent and that said Letters Patent is hereby corrected as shown below:

On the Title Page

In item (72), in "Inventors", in Column 1, Line 3, delete "Forster City," and insert --Foster City,-- therefor Signed and Sealed this
Fourteenth Day of April, 2020

Andrei Iancu
*Director of the United States Patent and Trademark Office*